United States Patent
Kassman et al.

(12) United States Patent Kassman et al.

(10) Patent No.: US 6,945,559 B2
(45) Date of Patent: Sep. 20, 2005

(54) METHOD AND APPARATUS FOR AIR BAG VENTING

(75) Inventors: Mark E. Kassman, Miamisburg, OH (US); Michael J. Vendely, Kettering, OH (US); Suresh D. Shah, Troy, MI (US); Mansour Ashtiani, Beverly Hills, CA (US); Ismat A. Abu-Isa, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/247,387

(22) Filed: Sep. 19, 2002

(65) Prior Publication Data

US 2004/0056459 A1 Mar. 25, 2004

(51) Int. Cl.[7] ............................ B60R 21/28; B60R 21/32
(52) U.S. Cl. ........................................ 280/735; 280/739
(58) Field of Search ................................. 280/734, 735, 280/736, 737, 739, 742; 701/45–47

(56) References Cited

U.S. PATENT DOCUMENTS

| | | | | |
|---|---|---|---|---|
| 5,016,913 A | * | 5/1991 | Nakajima et al. | 280/738 |
| RE34,204 E | * | 3/1993 | Takada | 280/739 |
| 5,492,363 A | * | 2/1996 | Hartmeyer et al. | 280/739 |
| 5,518,269 A | * | 5/1996 | Storey et al. | 280/739 |
| 5,725,244 A | * | 3/1998 | Cundill | 280/739 |
| 5,797,619 A | * | 8/1998 | Bauer et al. | 280/728.3 |
| 6,131,949 A | * | 10/2000 | Lewis et al. | 280/739 |
| 6,241,279 B1 | * | 6/2001 | Ochiai | 280/735 |
| 6,290,257 B1 | * | 9/2001 | Bunce et al. | 280/739 |
| 6,497,183 B2 | * | 12/2002 | Demarquilly et al. | 105/392.5 |
| 6,517,108 B1 | * | 2/2003 | Vinton et al. | 280/739 |
| 6,705,642 B1 | * | 3/2004 | Serban et al. | 280/739 |
| 6,752,420 B2 | * | 6/2004 | Ziolo et al. | 280/739 |
| 6,773,030 B2 | * | 8/2004 | Fischer | 280/739 |
| 2003/0020266 A1 | * | 1/2003 | Vendely et al. | 280/739 |
| 2003/0201630 A1 | * | 10/2003 | Moon | 280/739 |

* cited by examiner

*Primary Examiner*—Paul N. Dickson
*Assistant Examiner*—Laura B. Rosenberg
(74) *Attorney, Agent, or Firm*—Scott A. McBain

(57) ABSTRACT

An apparatus and method for customizing the pressure within an inflatable cushion of an air bag module is provided. The method comprises determining whether additional venting of an air bag is required. A sensing and diagnostic module will receive its relative inputs from a plurality of sensors and will determine whether vents in an inflatable cushion should be opened to allow diffusion of an inflation gas. The apparatus allowing vents to open at specified times to allow for diffusion of the inflation gas.

14 Claims, 8 Drawing Sheets

METHOD AND APPARATUS FOR AIR BAG VENTING

TECHNICAL FIELD

This application relates generally to air bags for vehicles. More specifically, this application relates to a method for various ways of controlling the diffusion of the inflator gas during deployment of an air bag.

BACKGROUND

Air bags have become common in modern automobiles. An air bag module including an inflatable cushion and an inflator is installed in the desired position within the vehicle. The cushion is stored in a folded position within the air bag module. In response to a threshold event or occurrence, a sensor provides a signal for activating the inflator. The inflator provides a supply of inflating gas to the cushion to inflate the cushion.

There are several types of inflators for air bag modules. One type is the pure gas inflator wherein a pressure vessel contains stored pressurized gas. The pressure vessel communicates with the cushion through various types of rupturable outlets or diaphragms. Another type is the gas generator wherein a propellant is ignited and the resultant gas flow through an outlet to the cushion. A third type is the hybrid or augmented type. This type includes a pressure vessel containing stored pressurized gas and a gas generator. When the generator is ignited, the resultant gas flows with the stored gas to the cushion through the pressure vessel outlet.

In some applications there are vents in the inflatable cushion that allow the inflation gas to escape the confinements of the bag. These vents allow for egress of the inflation gas as the pressure builds up inside the cushion. Typically, these vents are open at all times during a deployment or inflation of the air bag.

SUMMARY

Apparatus and various methods for customizing the pressure within an inflatable cushion of an air bag module is provided. The method comprises determining whether additional venting of an air bag is required. A sensing and diagnostic module comprising a microcontroller will receive its relative inputs from a plurality of sensors and will determine whether vents in an inflatable cushion should be opened to allow diffusion of an inflation gas.

A method for allowing vents in an inflatable cushion to open at specified times to allow for diffusion of the inflation gas.

The above-described and other features and advantages of the present invention will be appreciated and understood by those skilled in the art from the following detailed description, drawings, and appended claims.

DESCRIPTION OF THE PREFERRED EMBODIMENT

This disclosure is directed to a concept described as active venting. In an exemplary embodiment a plastic membrane will be attached to an air bag cushion to cover an opening in the cushion. The membrane will be strong enough to withstand the internal pressures of a deployment scenario wherein no additional venting is required or requested by the controller or control system (e.g., no removal of the plastic membrane). In addition, the membrane will be coated to be electrically conductive and electrical leads are attached as well.

In accordance with the present disclosure and during an incident when the air bag deploys, the system in the vehicle will determine if extra venting is needed. If there is a need for additional venting, the system will send an electrical pulse to the membrane. This electrical pulse will be used to weaken the membrane through heating of the same so that it will rupture and thus open the vent to allow more gas to escape.

An advantage of this type of active venting is that the system will determine if extra venting is needed and the system will also determine when the vents will open. As an alternative the membrane can be utilized on all of the vents in the cushion or on just one, depending on the requirements of the system and/or its application.

Figure 1:
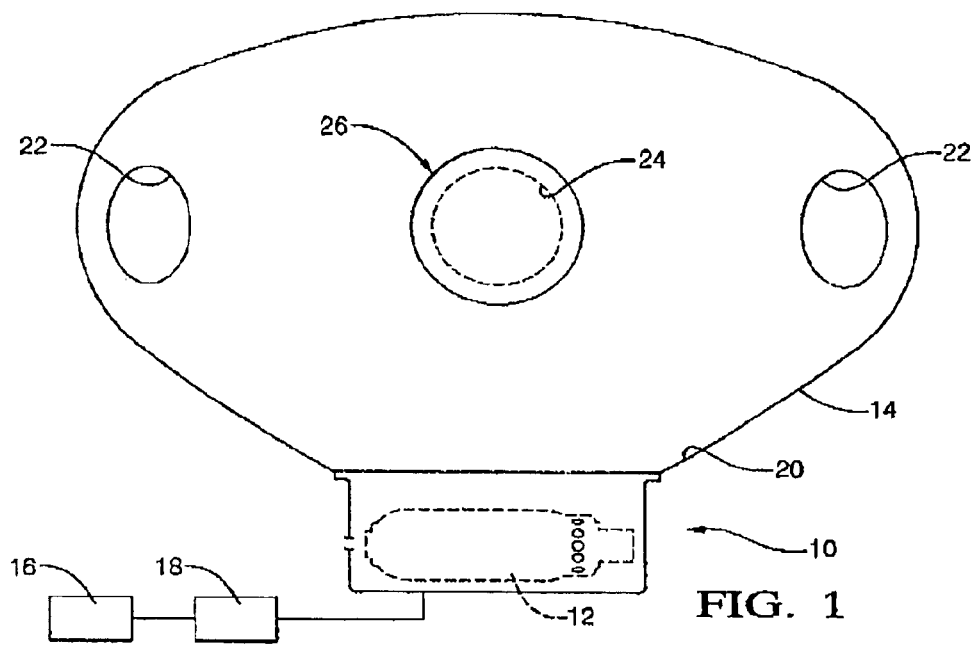
FIG. 1 is side view of an inflatable restraint system having the active venting mechanism of the present disclosure in an expanded state.

Referring to the Figures and particularly to FIG. 1, an air bag module 10 is illustrated. Air bag module 10 generally depicts a passenger side air bag module configuration. It is, of course, contemplated that the disclosure of the present application may be incorporated into other air bag module configurations, for example, driver's side devices, door mounted devices and other various schemes. Module 10 includes an inflator 12 and an inflatable cushion 14. Module 10 is configured to be disposed within a cavity defined in a dashboard or interior surface of a vehicle (not shown).

A sensor 16 is adapted to detect an activation event to provide an activation signal to inflator 12 or alternatively a sensing and diagnostic module 18 for controlling the activation of the inflator of the airbag module. Sensor 16 or a plurality of sensors are positioned to detect vehicle conditions and generate a signal to the inflator or sensing and diagnostic module. Cushion 14 is stored in a folded position in module 10 and is in fluid communication with inflator 14 through an inflation opening 20 in cushion 14. Thus upon activation of inflator 12, cushion 14 is adapted to inflate.

Figure 2:
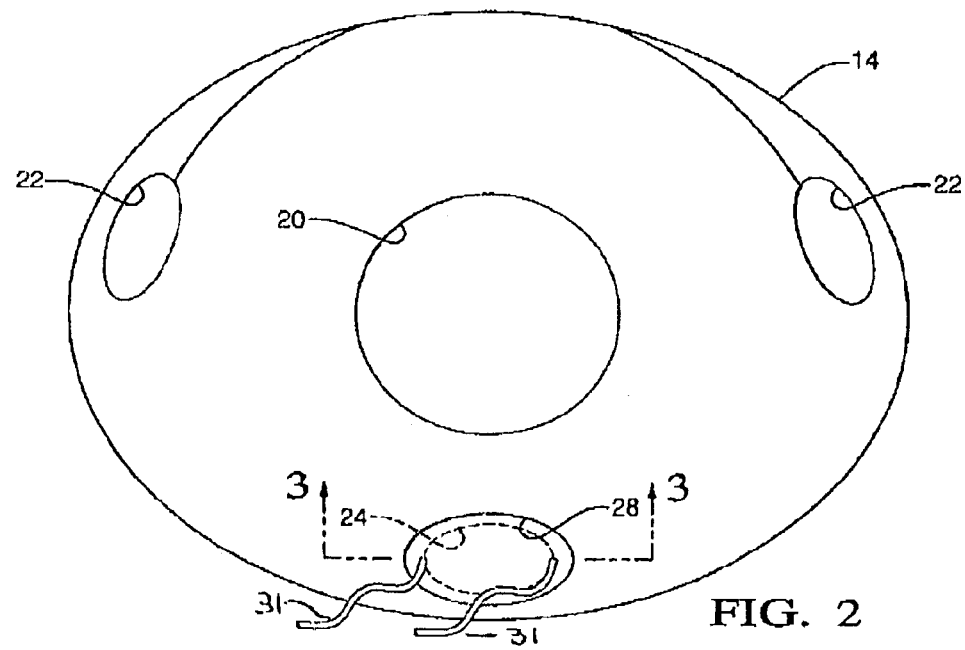
FIG. 2 is a view of a portion of an inflatable cushion.
Figure 3:
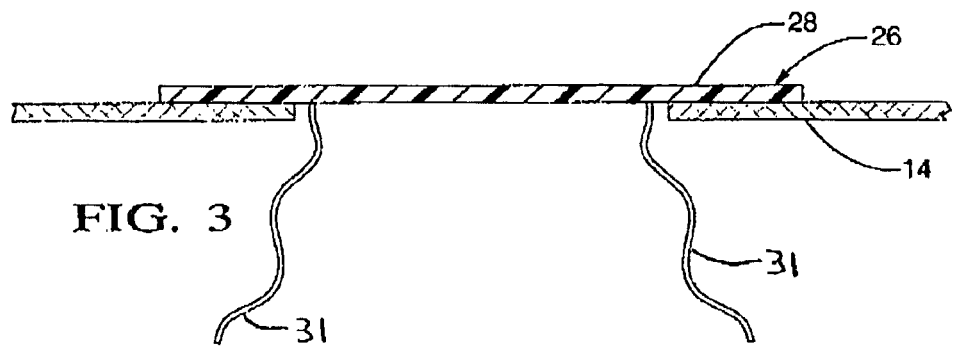
FIG. 3 is a view along lines 3—3 of FIG. 2.
Figure 4:
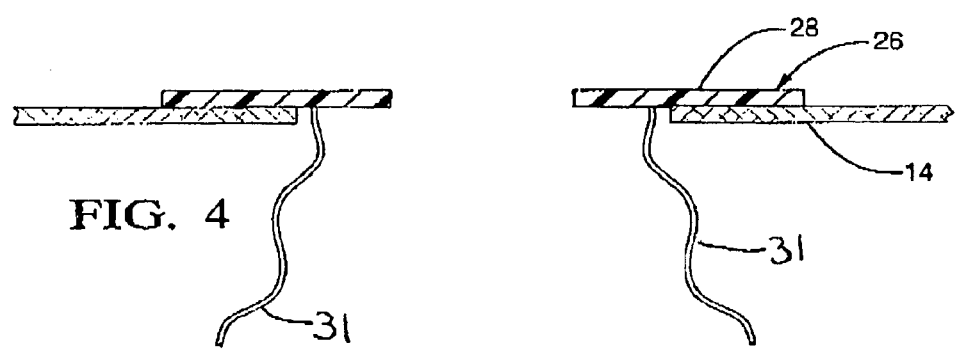
FIG. 4 is a view illustrating a venting position of the active venting mechanism of the present disclosure.
Figure 5:
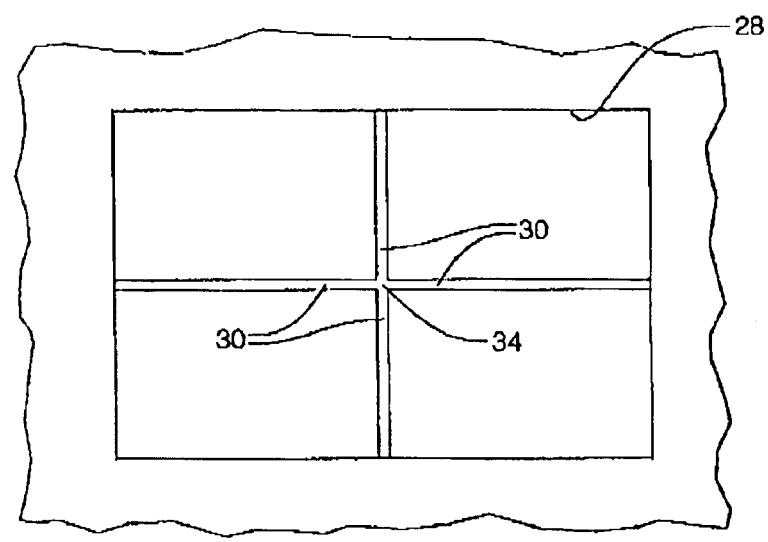
FIGS. 5–8 are views illustrating the active venting mechanism of the present disclosure in various states of deployment.

Referring now to FIGS. 2–4 a lower portion of cushion 14 is illustrated. Cushion 14 includes inflation opening 20 configured for securement within a housing of module 10. Inflation opening 20 is in fluid communication with inflator 12 so as to receive the inflation gas being disposed by the inflator. Cushion 14 also includes a pair of vent openings 22. Vent openings 22 are always in fluid communication with the exterior of cushion 14 and provide a means for allowing the inflation gas of inflator 12 to disperse out of cushion 14 once cushion 14 has been deployed and fully inflated. Although FIGS. 1 and 2 illustrate cushion 14 with a pair of vent openings 22 it is, of course, contemplated that the number of vent openings may be greater or less than two or not included at all.

Also disposed on the surface of cushion 14 is a supplemental or auxiliary vent opening 24. Supplemental vent opening 24 is enclosed by a dispersible cover or venting mechanism 26 capable of either remaining over and enclosing supplemental vent opening 24 or alternatively opening supplemental vent opening 24 in order to allow additional venting of the inflation gases disposed within the interior of the inflatable cushion 14. In addition, and as an alternative, a venting mechanism is capable of being placed over all of the vent openings of the inflatable cushion.

Referring now to FIGS. 1–8, supplement vent opening 24 is covered by a membrane 28, in an embodiment of the present disclosure membrane 28 is made out of polymeric film such as polyester, polyolefins, preferably high molecular weight PE, polyamides, Nylon and equivalents thereof. The film or membrane 28 will be pre-stretched or stretched as it is ultrasonically welded/stitched and finally hermetically sealed using appropriate polymeric sealants to the periphery of opening 24.

The film is provided with a heating element or mechanism wherein the application of a current will increase the temperature of the membrane by resistive heating to the point where it will either melt or weaken to a point which will allow the stretched membrane to tear under the internal pressure of the inflatable cushion.

In order to provide the healing element or mechanism the film is coated on either or both sides with a thin layer of electrically conductive coating for generating resistance heating. For example the layer of electric resistance coating is only a few microns thick. Of course, and as applications require the thickness of the electric resistance coating may vary in thickness. The electrically conductive coating acts as the electrically resistive heating element(s); a very thin silver coating or copper filament or strip attaches electrical power to them. Thus, once a current is received electrically conductive coating increases in temperature until membrane 28 is sufficiently weakened to allow uncovering of the vent opening.

Alternatively, High Resistive Heating Elements (also referred to as Electrodes) 30 pre-arranged in predetermined fashion for desired rupture. Electrodes 30 are applied to the cushion and the membrane by commercially known methods such as silk screening or other means. In addition, the electrodes are electrically connected to a voltage source through wire leads 31 that are sewn into or secured to the inflatable cushion and are secured to the electrodes at one end and the voltage source at the other. Similarly, and once a current is received, the electrodes increase in temperature until membrane 28 is sufficiently weakened to allow uncovering of the vent opening.

In yet another alternative, a combination of the thin layer of electrically conductive coating 30 and High Resistive Heating Elements are provided on the surface of membrane 28. Thus, current is capable of being supplied to the High Resistive Heating Elements through the conductive coating or alternatively a direct connection to a source of electrical current.

Upon the occurrence of an activation event or occurrence wherein deployment of the air bag module is required signals will be transmitted to the sensing and diagnostic module (SDM). The SDM controls the deployment of the air bag module when an activation event occurs.

The sensing and diagnostic module (SDM) receives a plurality of inputs from a plurality of sensors and determines whether an air bag deployment is necessary and whether active venting is required.

The SDM receives signals (such as vehicle decelerations and impact sensors) in order to determine whether an air bag should be deployed. One of sensors 16 is an electronic frontal sensor (EFS), which is an external sensor mounted in the engine compartment, typically on the radiator tie bar to supplement the internal sensors of the SDM in detecting and responding in a timely manner to threshold impacts such as the offset deformable barrier impact. In addition, the SDM has its own internal sensors for measuring vehicle decelerations. The EFS will be used to enhance the overall sensing system performance by providing early information to the SDM to determine airbag deployment.

Accordingly, and if the appropriate signals from the sensors located throughout the vehicle are received, a signal for initiating the deployment of an air bag is generated by the SDM.

Upon airbag deployment and if the appropriate signals for activation of active venting is received the SDM will instruct a current to be received by the electrodes disposed on membrane 28. The current may be provided by any electrical storage medium adapted to be electrically connected to the electrodes. The current traveling through the resistance of the elements will instantaneously heat up the polymer film, causing the polymer film in that area to rupture due to the increased pressure with the air bag. The increased pressure due to the inflation gases being expelled into the inflatable cushion provides a force for rupturing the polymer film after it has been weakened.

Accordingly, the membrane will rupture along the tear pattern defined by the electrodes. The rupture or tear patterns are capable of being arranged in the different patterns resembling a plus sign (+) or a cross (X). Of course, other arrangements are contemplated in accordance with the present disclosure.

The plus or cross arrangements allows arcing to occur at a center point 34 where two (or more, if applicable) electrodes (High Resistive Heating Elements) cross each other will maximize the temperature rise and causes the melting and rupture of the film at the center of the membrane. The polymeric film has enough strength, which does not allow it to rupture during normal deployment at all operating temperatures thus, the electrodes (High Resistive Heating Elements) are necessary to cause the film to rupture and allow additional venting through opening 24.

Figure 6:
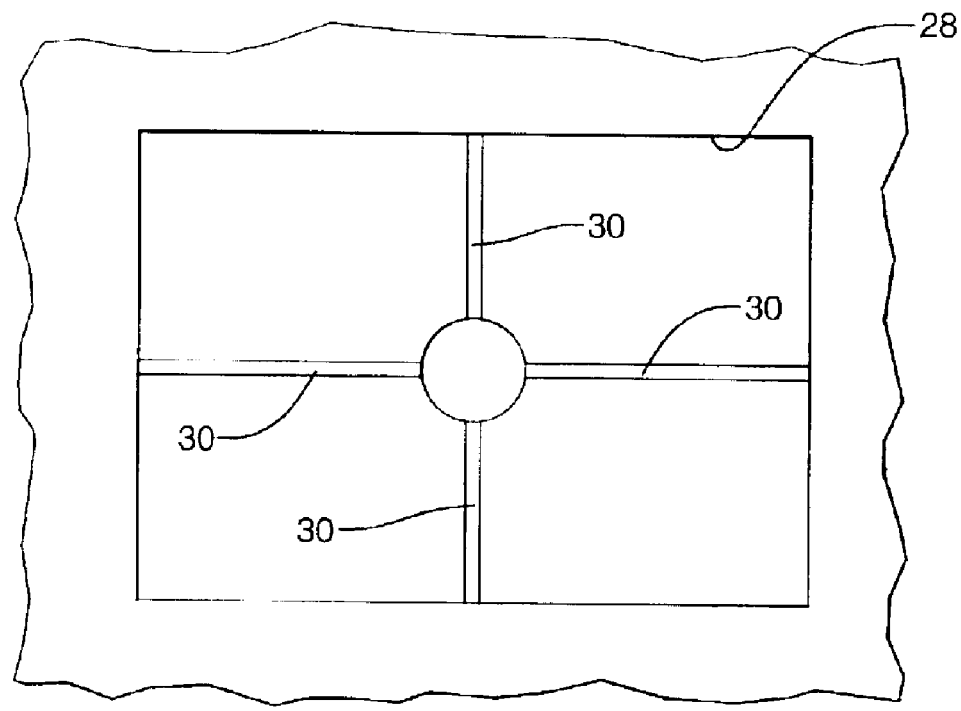
Figure 7:
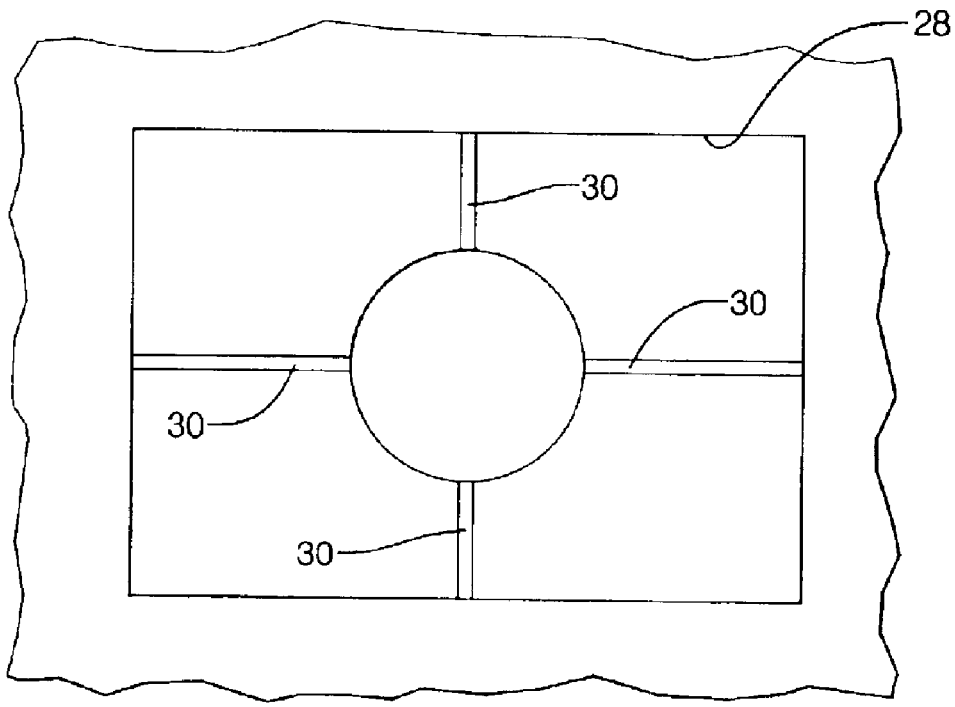
Figure 8:
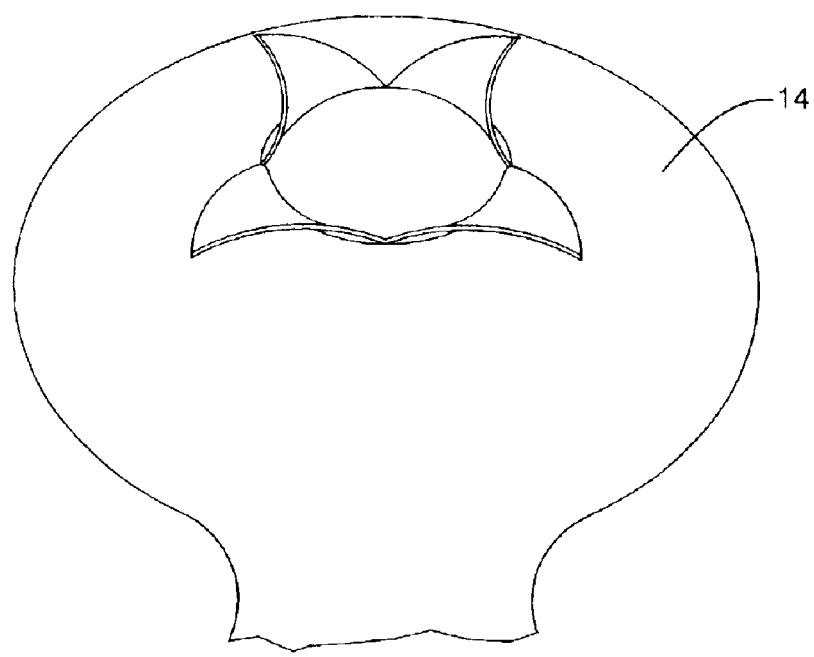

Upon rupture, portions of the membrane will still be secured to the air bag cushion however, the tear pattern will allow venting as the ruptured portions of the membrane will deflect outwardly due to the increased pressure within the air bag cushion (FIGS. 6–8).

As an alternative, the electrode (High Resistive Heating Element) pattern is configured to provide more arcing points and consequently more number of rupture points.

Figure 9:
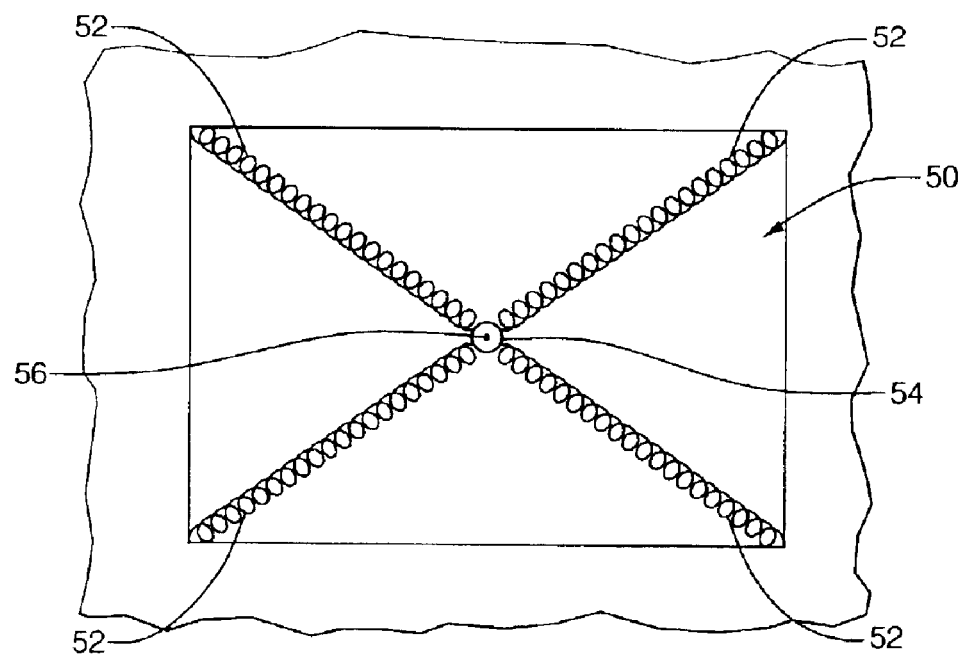
FIGS. 9–11 are views illustrating an alternative active venting mechanism of the present disclosure in various states of deployment.
Figure 10:
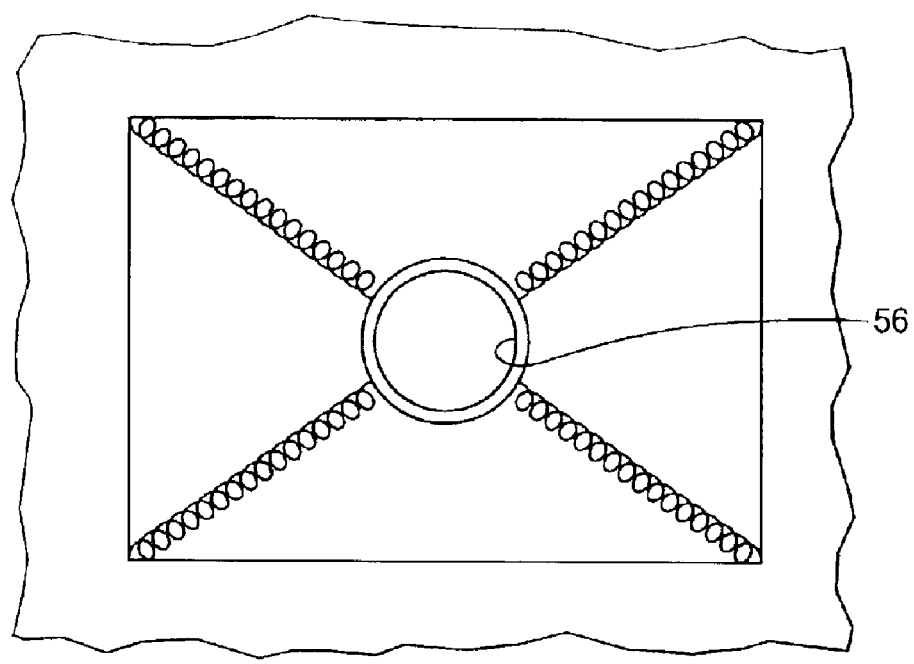
Figure 11:
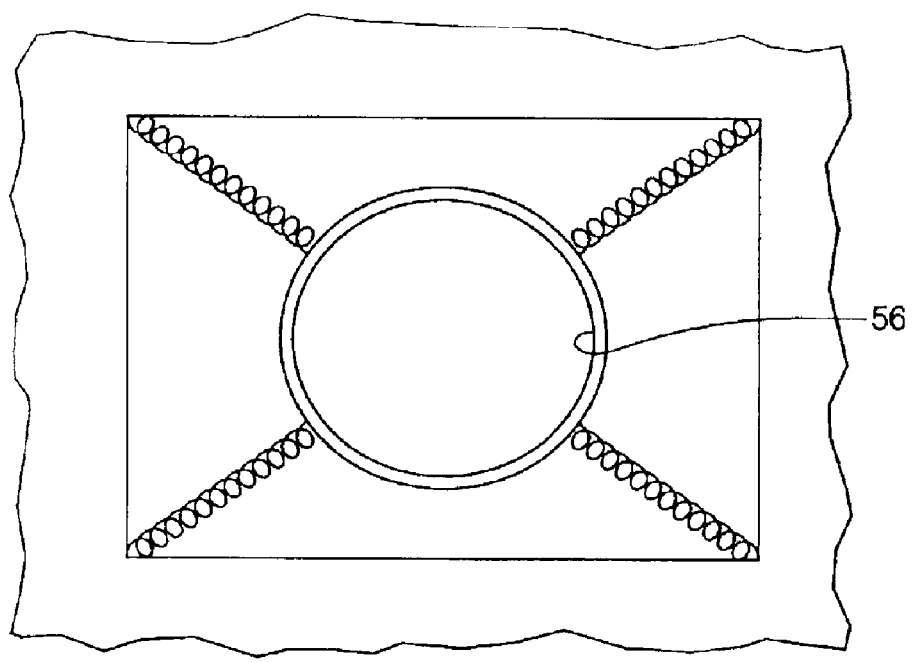

As yet another alternative and referring now to FIGS. 9–11, a shape memory actuator is used to provide the active venting of the inflatable air bag cushion. As in FIGS. 1–8, the membrane is made out of polymeric film such as polyester, polyolefins, preferably high molecular weight PE, polyamides, Nylon and equivalents thereof.

In this embodiment, a shape memory actuator 50 is disposed on the membrane. The shape memory actuator includes a shape memory alloy (SMA) filaments or springs 52. SMA springs are devices which when a current is applied thereto they are drawn into a new configuration. In the present application, the SMA springs will be shortened in length thereby allowing for additional venting to occur. The filaments or springs are secured as shown in FIGS. 9–11. The SMA springs are secured to an elastic member 54 disposed about an opening 56 in the inflatable air bag cushion at one end and a source of current (not shown) at the other. An example of an elastic member contemplated for use in the present application is a HYTREL ring shape element; of course other types of elastic members are contemplated for use in the present application. The circle is chosen in order to keep the radial growth evenly outward. Of course, other configurations are contemplated for use in the present disclosure.

Upon airbag deployment and if the appropriate signals for activation of the venting mechanism are received, the SMA actuators will be activated, and will draw the elastic member open (FIGS. 10 and 11) thereby enlarging the size of opening 56 in the inflatable air bag cushion at rapid rate. Through the use of the SDM and variance of the electrical current through SMA springs the additional venting of the air bag cushion is a controllable event wherein various size openings for venting are available.

Alternatively, the membrane may be an elastic material having an opening therein and the SMA actuators will cause the opening to enlarge. As yet another variation of this embodiment the opening in the membrane is the primary (always open) vent opening and the SMA actuators provide additional venting by enlarging the opening.

Figure 12:
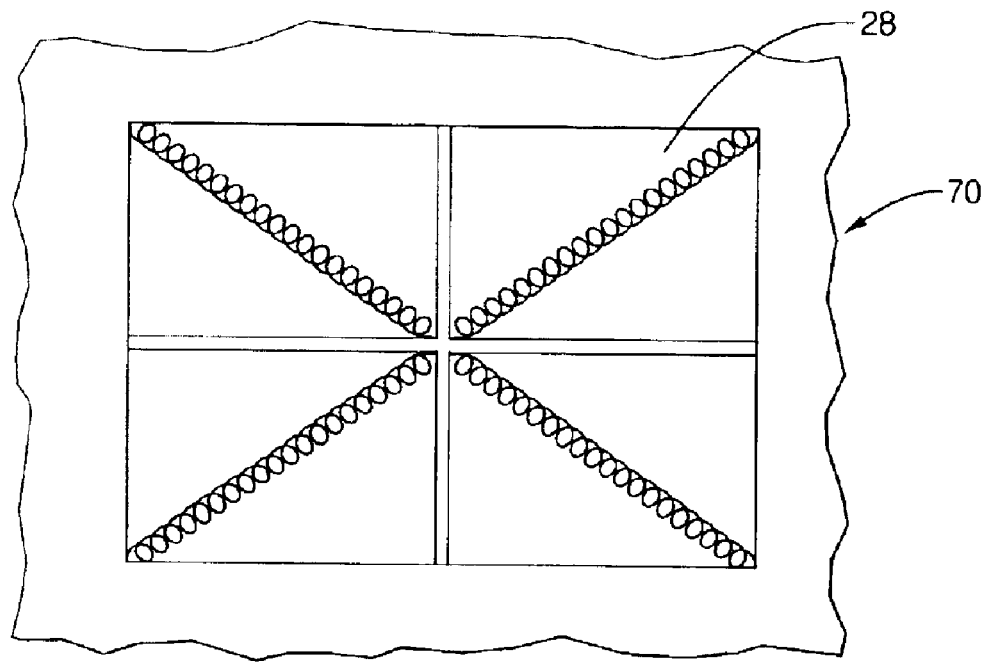
FIGS. 12–14 are views illustrating another alternative active venting mechanism of the present disclosure in various states of deployment.
Figure 13:
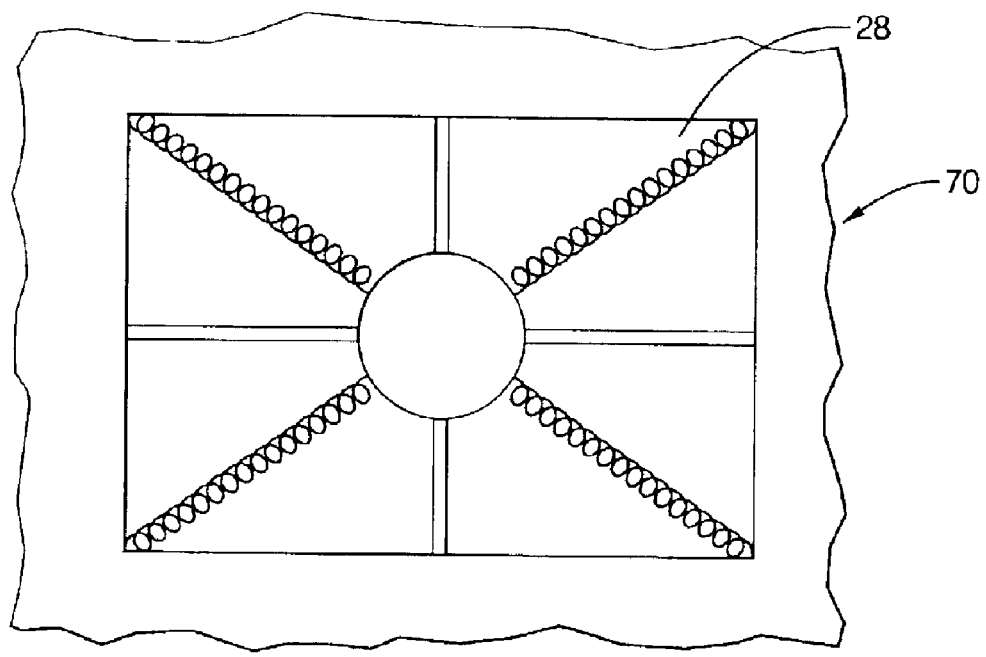
Figure 14:
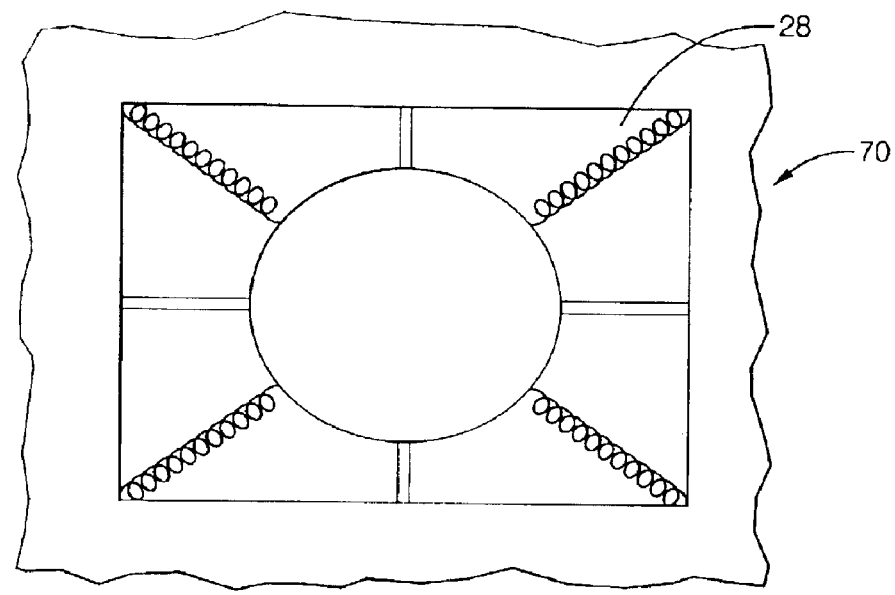

As yet another alternative and referring now to FIGS. 12–14, the shape memory actuator (FIGS. 9–11) is combined with resistive heating venting mechanism or scheme of FIGS. 1–8 to provide a combined venting mechanism 70.

Upon airbag deployment and if the appropriate signals for activation of active venting is received the SDM will instruct an electrical signal to be received by the electrodes disposed on membrane 28. The electrical signal instantaneously heats up the polymer film, causing the polymer film in that area to rupture or melt due to the increased pressure within the air bag and the increase heat provided by the heating elements. The increased pressure being the inflation gases being expelled into the inflatable cushion. The arcing will occur at the center of the film (patch) creating a small hole and subsequently the SMA filaments/springs will also be activated, enlarging the hole at a very rapid rate in conjunction with the resistive heating. This method assures the rupture the desired area.

Figure 15:
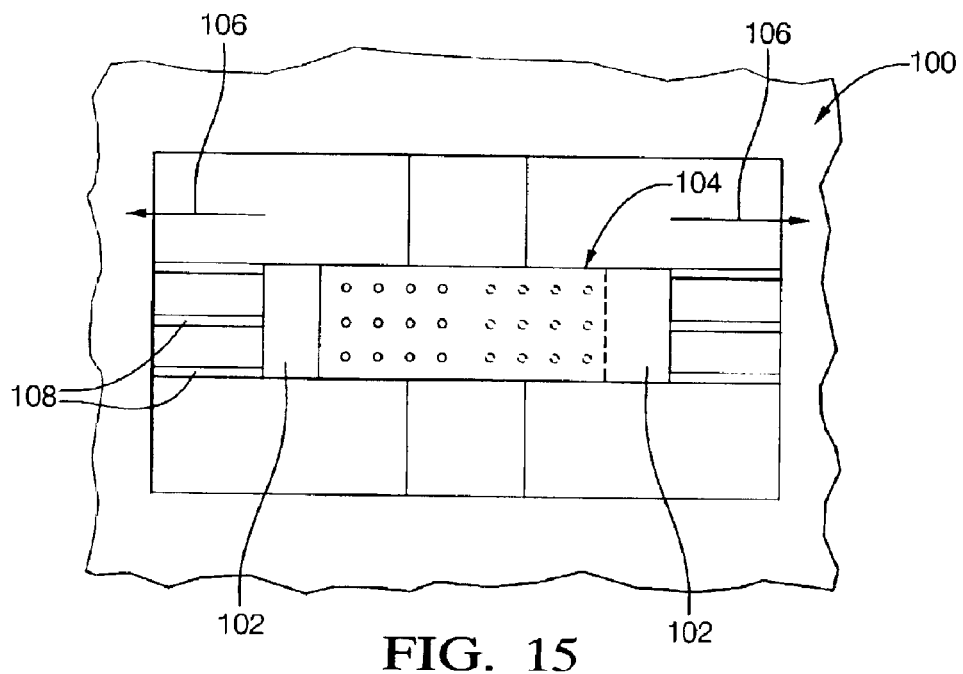
FIGS. 15 and 16 are views illustrating yet another alternative active venting mechanism of the present disclosure in various states of deployment.
Figure 16:
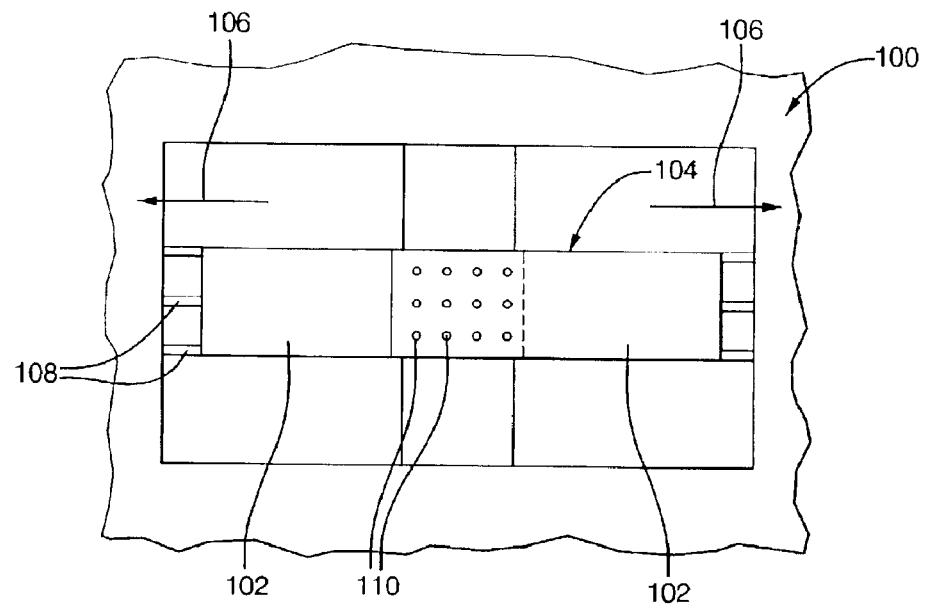

As yet another alternative and referring now to FIGS. 15–16, a slidable vent mechanism 100 is disposed on the surface of the inflatable air bag cushion. As shown in FIGS. 15–16, a slidable vent gate or gates 102 is capable of being moved from a closed position (FIG. 15) to an open position (FIG. 16). The vent is slidably received with a housing structure 104 configured to allow movement of vent 102 in the direction of arrows 106 when a force is applied to slidable vent 102 through the use of an activating or force applying mechanism 108. Housing structure 104 is configured to allow vent 102 to slide in the direction of arrows 106 while still remaining attached to the inflatable airbag.

FIGS. 15 and 16 illustrate two slidable vents moving in opposite directions; in a closed position (FIG. 15) the slidable vents are capable of overlapping each other to ensure blockage of the vents holes or openings. Alternatively, a single slidable vent 102 is capable of blocking and unblocking vent holes 110.

Housing structure 104 is configured to have a plurality of openings 110 which are positioned over an opening in the inflatable airbag cushion. When slidable vent 102 is in the position of FIG. 15, the vent openings are blocked, as slidable vent 102 moves to the position in FIG. 16 the vent openings are open and fluid communication between the interior of the airbag cushion and the exterior is now possible. Accordingly, additional venting is possible when the mechanism used in the configuration of FIG. 16. It is of course, contemplated that openings 110 may vary in number and have various sizes or configurations.

In an exemplary embodiment, slidable vent 102 is positioned between an opening in the inflatable cushion and a portion of the venting mechanism 100 that has the plurality of openings 110.

In an exemplary embodiment, various actuators 108 are embedded into the air bag cushion material in critical locations for active venting to occur. Actuators 108 are attached to slidable vent 102 and are configured to provide an actuating force capable of sliding vent 102 within housing structure 104 to move vent 102 in the direction of arrows 104. An example of actuators 108 are shape memory alloys (SMA), springs, tethers, biasing members, artificial muscles all of which are activatable by the application of a current or signal from the sensing and diagnostic module or alternatively may be temperature or pressure controlled, which will relate to the inflating airbag. Activation of the actuators moves the vent gate in order to adjust the over lap of vent holes on the opening in the inflatable air bag cushion. Due to the active function of the SDM in accordance with the received inputs the apparatus can open the vent slightly or fully, which will assist the airbag deployment for various size occupants and conditions.

Figure 17:
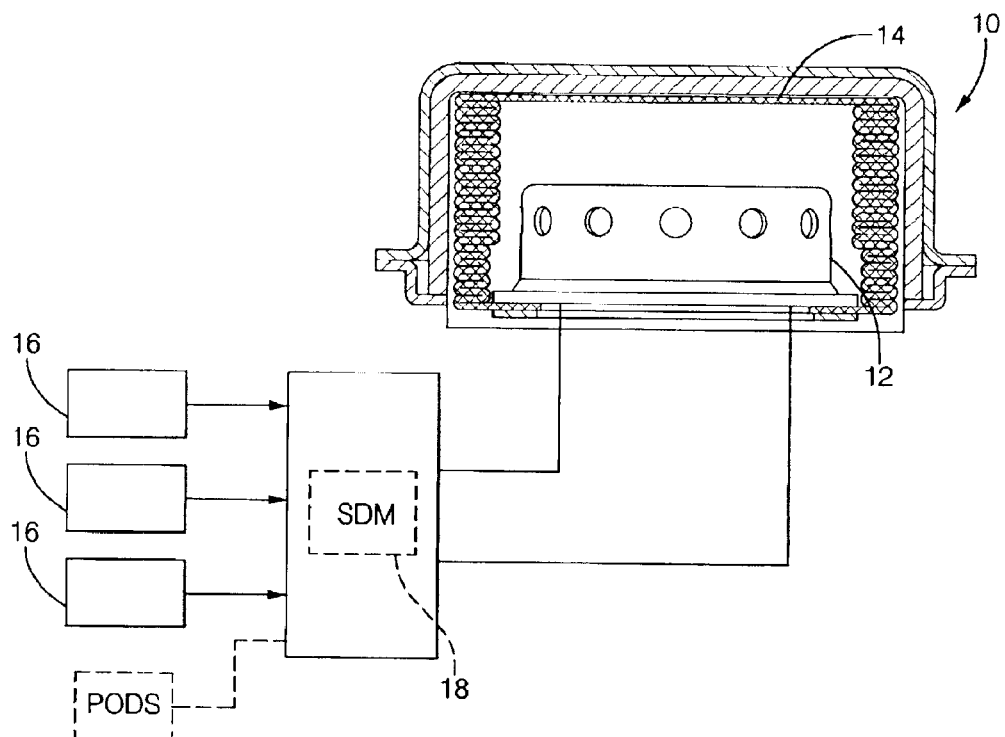
FIG. 17 is a schematic view of an air bag module system.

Accordingly, the present disclosure is directed to a restraint system having among other elements an inflatable air bag cushion using airbag activation logic to determine the venting scheme of the inflatable air bag cushion. A schematic view of an airbag module system is illustrated in FIG. 17. In an exemplary embodiment, the air bag activation logic is a control algorithm resident upon a microcontroller disposed in a sensing and diagnostic module located within the vehicle. The airbag activation logic will issue control signals based upon inputs received from a plurality of sensors disposed about the vehicle. The sensors will provide information necessary to determine whether activate is required.

Sensor inputs may be received from a passive occupant detection system (PODS), seat belt inputs either from an automatic locking retraction (ALR) switch or belt tension sensor (BTS), and deployment logic to appropriately control the airbag deployment and assist in the restraint of an occupant.

The passive occupant detection system (PODS) will provide input into the SDM. A passive occupant detection system is a sensing system installed in the seat cushion which senses the weight of the occupant to determine if infants, small children or adults are present (in the passenger seat) and if necessary, instructs the SDM to utilize air bag suppression. Separate from or as part of the PODS, a seat belt mode sensor (ALR SW) or belt tension sensor (BTS) may also be provided to detect the installation of a child seat and modify or replace the decision of the PODS system. Of course, other sensing systems are contemplated to be used with the present disclosure.

A Passive Occupant Detection system (PODS) includes a seat mounted sensor used to detect the approximate size of the passenger occupant by weight. The sensor is used by the control system to suppress the passenger airbag in accordance with pre-determined criteria.

An automatic locking retractors switch (ALR SW) is a system that assumes that the use of a combination ELR/ALR seat belt system which normally operates in the emergency locking retractor (ELR) mode. When the belt is fully extended or above a pre-determined length, the belt system switches to an automatic locking retractor mode for use in securing certain infant and child seats. The ALR switch detects when the seat belt is in the ALR mode and provides this information to the control system. The control system uses this information in conjunction with the PODS data to determine if a child or infant seat is present in the passenger seat; and the control system suppresses the airbag, if appropriate.

The sensing and diagnostic module (SDM) is an electronic control module that senses and diagnoses signals from sensors and determines if the air bags, pre-tensioners, etc. should be deployed. The SDM uses inputs from both internal and external sensors to determine if air bag and/or pre-tensioner suppression is required.

The SDM also contains its own internal sensors for measuring vehicle decelerations for arming and discriminating purposes. In addition, an external electronic frontal sensor is positioned typically at the front of the vehicle to provide early detection of various impacts. The electronic frontal sensor (EFS) is an external sensor mounted in the engine compartment typically mounted on the radiator tie bar to supplement the internal sensors of the SDM in detecting and responding in a timely manner to threshold impacts such as the offset deformable barrier impact.

While only certain types of air bag modules are illustrated herein, it is contemplated that in accordance with the present invention the inflators described herein may be used in other air bag modules, including but not limited to, driver side air bag modules, passenger side air bag modules and side impact air bag modules.

The sensing and diagnostic module is also adaptable to detect one or more conditions of the seating structure. For example, sensing-and-diagnostic module can be adapted to detect one or more of the following: a load on the seating structure, a position of the seating structure, an angle of a portion of the seating structure with respect to another portion, the distance the seating structure is from the air bag module, and other data that is relevant to the deployment of the airbag. For example, the sensing-and-diagnostic module can receive input from one or more sensors such as, but not limited to, a seat position sensor, an optical scanner, a load sensor, a seat recline sensor, a seat belt use detection sensor, and a belt tensioning sensor. The sensors are positioned to provide input signals to the module indicative of one or more seat conditions.

The seat position sensor detects the position or distance of seating structure with respect to the air bag module. Similarly, the optical scanner can be used to detect the position of seating structure. The load sensor is disposed within the seating structure and can be used to detect the load on the seating structure. Thus, the sensor is capable of detecting the specific weight or load on a portion of seating structure. The seat recline sensor can be used to detect the degree or angle to which an upper or back portion of the seating structure is reclined or positioned with respect to a lower or seat portion of seating structure. The seat belt use detection sensor can determine whether the seat belt is secured (e.g., buckled is inserted into its corresponding clasp). The seat belt tensioning sensor, alone or in combination with the load sensor, can also be used determine the load on the seating structure.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A venting mechanism disposed on an inflatable cushion for use in an air bag module, comprising:
   a membrane being sealed to the inflatable cushion to cover a vent opening in the cushion; and
   a plurality of shape memory alloy springs or wires disposed in a pre-arranged pattern on said membrane, said plurality of shape memory alloy springs or wires being secured to an elastic member disposed about an opening in said inflatable cushion and being adapted to receive an electrical charge wherein said electrical charge causes said plurality of shape memory alloy springs or wires to enlarge said elastic member and said opening.

2. A venting mechanism disposed on an inflatable cushion for use in an air bag module, comprising:
   a membrane being sealed to the inflatable cushion to cover a vent opening in the cushion;
   a plurality of electrodes or high resistive heating elements being disposed in a pre-arranged pattern on said membrane, said plurality of electrodes or high resistive heating elements being adapted to receive an electrical charge wherein said electrical charge causes an area of said membrane to weaken causing a vent aperture to be formed in the inflatable cushion; and
   a plurality of shape memory alloy springs disposed in a pre-arranged pattern on said membrane, said plurality of shape memory alloy springs being secured to said membrane and being adapted to receive an electrical charge wherein said electrical charge causes said plurality of shape memory alloy springs to enlarge said area.

3. The venting mechanism as in claim 2, wherein said plurality of electrodes or high resistive heating elements are arranged to overlap each other creating an arcing point.

4. The venting mechanism as in claim 2, wherein said plurality of electrodes or high resistive heating elements increase the temperature of said membrane when said electrical charge is received.

5. The venting mechanism as in claim 4, wherein said plurality of electrodes or high resistive heating elements are arranged to overlap each other creating an arcing point.

6. The venting mechanism as in claim 5, wherein said arcing point increases the temperature of said membrane at a higher rate than other areas of said membrane.

7. A method for providing active venting in an inflatable cushion of an airbag module, comprising:
   determining is an additional vent opening is required;
   providing a vent member slidably received in a vent housing attached to the inflatable cushion and overlying an opening in the inflatable cushion; and activating an actuator attached to the vent member to slide said vent member within said vent housing and thereby open said opening, said actuator being formed of a shape memory alloy.

8. A method for providing active venting in an inflatable cushion of an airbag module, comprising:

determining if an additional vent opening is required;

manipulating a membrane being sealed to the inflatable cushion to cover a vent opening in the cushion, said membrane comprising a plurality of shape memory alloy springs or wires disposed in a pre-arranged pattern on said membrane, said plurality of shape memory alloy springs or wires being secured to an elastic member disposed about an opening in said inflatable cushion and being configured to receive an electrical charge wherein said electrical charge causes said plurality of shape memory alloy springs or wires to enlarge said elastic member and said opening.

9. A method for providing active venting in an inflatable cushion of an airbag module, comprising:

determining if an additional vent opening is required;

manipulating a membrane being sealed to the inflatable cushion to cover a vent opening in the cushion by supplying a current to a plurality of electrodes or high resistive heating elements being disposed in a pre-arranged pattern on said membrane, wherein said current causes an area of said membrane to weaken causing a vent aperture to be formed in the inflatable cushion; and supplying current to a plurality of shape memory alloy springs disposed in a pre-arranged pattern on said membrane, said plurality of shape memory alloy springs being secured to said membrane wherein said current causes said plurality of shape memory alloy springs to enlarge said area.

10. An inflatable cushion for use in an air bag module, comprising:

a membrane being secured to the inflatable cushion to cover a vent opening in the cushion; and a thin layer of electrically conductive coating disposed on a surface of said membrane covering said vent opening, wherein said thin layer of electrically conductive coating is configured to provide resistance heating to a portion of said membrane when a current is supplied to said thin layer of electrically conductive coating, wherein the resistance heating weakens a portion of said membrane causing said vent opening to become uncovered.

11. The inflatable cushion as in claim 10, wherein another thin layer of electrically conductive coating is disposed on another surface of said membrane covering said vent opening.

12. The inflatable cushion as in claim 10, wherein a plurality of thin layers of electrically conductive coatings are disposed on said membrane.

13. The inflatable cushion as in claim 12, wherein at least two of said plurality of thin layers of electrically conductive coatings overlap each other.

14. The inflatable cushion as in claim 12, wherein a copper filament is in electrical contact with said plurality of thin electrically conductive coatings in order to provide the current.

* * * * *